US011688253B2

(12) United States Patent
Hare, Jr. et al.

(10) Patent No.: US 11,688,253 B2
(45) Date of Patent: *Jun. 27, 2023

(54) RELAYING DEVICE STATUS INFORMATION USING LIGHT INDICATOR PATTERNS

(71) Applicant: ARRIS Enterprises LLC, Suwanee, GA (US)

(72) Inventors: William Charles Hare, Jr., Cumming, GA (US); Yury Melnikov, Conshoshocken, PA (US); William Mohr, Cumming, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,587

(22) Filed: Mar. 1, 2022

(65) Prior Publication Data

US 2022/0189261 A1    Jun. 16, 2022

Related U.S. Application Data

(63) Continuation of application No. 17/142,471, filed on Jan. 6, 2021, now Pat. No. 11,288,935.

(Continued)

(51) Int. Cl.
*G08B 5/36*    (2006.01)
*H04B 10/114*    (2013.01)
(Continued)

(52) U.S. Cl.
CPC ............... *G08B 5/36* (2013.01); *G06V 20/46* (2022.01); *G08B 5/38* (2013.01); *H04B 10/116* (2013.01);
(Continued)

(58) Field of Classification Search
CPC ......... G08B 5/36; G08B 5/38; H04L 12/2823; H04L 43/0817; G06V 20/46; H04B 10/116; H04B 10/1143; G02B 6/0073
See application file for complete search history.

(56) References Cited

U.S. PATENT DOCUMENTS

8,334,898 B1 * 12/2012 Ryan .................... H04N 5/2353
348/61
8,442,130 B2    5/2013 Koga
(Continued)

*Primary Examiner* — John A Tweel, Jr.
(74) *Attorney, Agent, or Firm* — Wenderoth, Lind & Ponack, L.L.P.

(57) ABSTRACT

Methods, systems, and computer readable media can be operable to facilitate recognizing and providing notification of events, states, and/or conditions associated with the CPE (customer premise equipment) device and/or associated networks or devices. An application running on a mobile device (e.g., smart phone) can be used to observe and diagnose electronic equipment (e.g., CPE device). Equipment can have indicators (audio, visual, etc.) that a human would have difficulty interpreting correctly. A mobile device application can be programmed to observe audio and/or visual indicators, report status and possibly recommend course(s) of corrective action to the user. Since the information observed by the mobile device is unidirectional (from the equipment to the mobile device) there is no increased security risk.

20 Claims, 5 Drawing Sheets

Related U.S. Application Data

(60) Provisional application No. 62/963,871, filed on Jan. 21, 2020.

(51) Int. Cl.
*G06V 20/40* (2022.01)
*H04B 10/116* (2013.01)
*G08B 5/38* (2006.01)
*H04L 12/28* (2006.01)

(52) U.S. Cl.
CPC ...... *H04B 10/1143* (2013.01); *H04L 12/2823* (2013.01)

(56) References Cited

U.S. PATENT DOCUMENTS

| | | | |
|---|---|---|---|
| 9,673,903 B2 * | 6/2017 | Liu | H04B 10/116 |
| 9,818,269 B1 * | 11/2017 | Ghodke | H04B 10/116 |
| 10,157,372 B2 * | 12/2018 | Brailovskiy | G06Q 30/04 |
| 10,403,101 B2 * | 9/2019 | Dureau | H04N 21/44218 |
| 10,529,196 B2 | 1/2020 | Sloo | |
| 11,288,935 B2 * | 3/2022 | Hare, Jr. | G08B 5/36 |
| 2021/0091852 A1 | 3/2021 | Parangattil | |

\* cited by examiner

RELAYING DEVICE STATUS INFORMATION USING LIGHT INDICATOR PATTERNS

TECHNICAL FIELD

This disclosure relates to relaying device status information using light indicator patterns.

BACKGROUND

In general, CPE (customer premise equipment) devices include a plurality of embedded subsystems. CPE devices may generate various events during the course of operation, and information concerning a variety of recognized events, states, and/or conditions associated with the CPE device and/or associated networks or devices may be generated by the sum total of these events. Knowledge of these events, states, and/or conditions would benefit users of the CPE device, installers, multiple systems operators, and others.

Equipment manufacturers are having to increase security to prevent unauthorized access to the equipment they provide because this access can be malicious. Increasing security often means limiting user interfaces such as telnet, web browser, SNMP (simple network management protocol), and others. Field problems can be more difficult to diagnose given reduced access.

Due to increased security requirements, gathering status information from a network-connected device is becoming more difficult. Traditional access methods such as HTTP, SSH and SNMP are being closed off due to known vulnerabilities. A secure method of accessing status information from a device is needed. Therefore, it is desirable to improve upon methods and systems for recognizing and providing notification of events, states, and/or conditions associated with the CPE device and/or associated networks or devices.

BRIEF DESCRIPTION OF THE DRAWINGS

Like reference numbers and designations in the various drawings indicate like elements.

DETAILED DESCRIPTION

Methods, systems, and computer readable media can be operable to facilitate recognizing and providing notification of events, states, and/or conditions associated with the CPE device and/or associated networks or devices. An application running on a mobile device (e.g., smart phone) can be used to observe and diagnose electronic equipment (e.g., CPE device). Equipment can have indicators (audio, visual, etc.) that a human would have difficulty interpreting correctly. A mobile device application can be programmed to observe audio and/or visual indicators, report status and possibly recommend course(s) of corrective action to the user. Since the information observed by the mobile device is unidirectional (from the equipment to the mobile device) there is no increased security risk.

A CPE device may include one or more light indicators such as LEDs. Each LED may be used to provide the status of a particular function of the device. One or more LEDs may be used to output detailed status information by blinking in such a way as to provide one or more status or error codes in binary. Furthermore, a mobile application utilizing a built-in video camera may be used to detect and interpret the status or error codes transmitted by the device.

Figure 1:
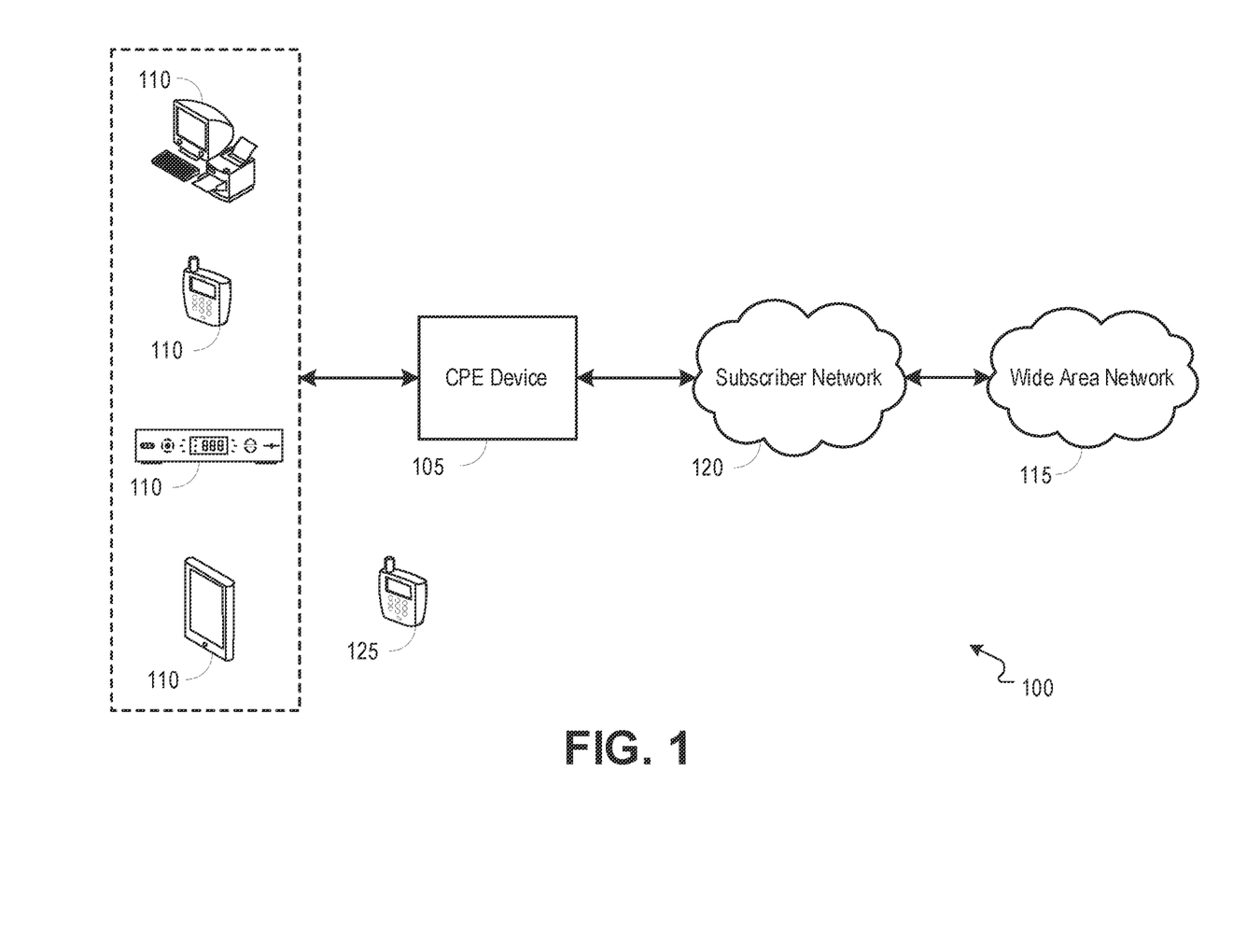
FIG. 1 is a block diagram illustrating an example network environment operable to facilitate the output and recognition of status information through the operation of one or more light indicators.

FIG. 1 is a block diagram illustrating an example network environment 100 operable to facilitate the output and recognition of status information through the operation of one or more light indicators. In embodiments, a CPE (customer premise equipment) device 105 may provide one or more services (e.g., video services, data services, voice services, etc.) to one or more client devices 110. The CPE device 105 may include a gateway, a cable modem, a wireless router including an embedded cable modem, a mobile hot-spot router, a multimedia over coaxial alliance (MoCA) node, a wireless extender, and any access point or other device that is operable to provide one or more services to one or more client devices 110. The client devices 110 may include a wide variety of devices such as televisions, mobile devices, tablets, set-top boxes, computers, telephones, security devices, and any other device that is capable of utilizing a wireless video, data, telephony, or security service, or that is otherwise capable of transmitting and/or receiving wireless communications.

In embodiments, the CPE device 105 may route communications between client devices 110 and a WAN 115 via a subscriber network 120. The subscriber network 120 may include various networks such as Ethernet (e.g., CAT5/CAT6), coaxial cable, optical fiber, twisted pair network, satellite networks, mobile networks including 4G and LTE, and others.

In embodiments, the CPE device 105 may include one or more light indicators (e.g., LED (light emitting diode)). The CPE device 105 may be configured to recognize a state or event and to generate and output a notification or indication of the recognized state or event. For example, the state or event may be recognized by the CPE device 105 as a state or event occurring at the CPE device 105, at a client device 110, at a local area network (LAN) provided by the CPE device 105, or at an upstream network or element.

In embodiments, the CPE device 105 may receive a request to output status information. Prior to receiving the request to output status information, the one or more light indicators of the CPE device 105 may operate according to normal or default operating parameters. For example, the one or more light indicators may be illuminated according to a normal or default illumination setting. An illumination setting may control a frequency at which each light indicator is illuminated or blinked, a color of illumination for each light indicator, and/or other visual parameters associated with a light indicator.

In embodiments, status information may be communicated from the CPE device 105 to the mobile device 125 over a Bluetooth (or other wireless communication interface) link between the CPE device 105 and the mobile device 125.

In embodiments, a mobile device 125 may be used to guide an end-user through a process for capturing and interpreting status information that is output by a CPE device 105 through the manipulation of one or more light indicators associated with the CPE device 105. For example, an application running on the mobile device 125 may be configured to capture and interpret the illumination of one or more light indicators according to one or more illumination pattern settings. The mobile application may instruct the end-user to perform an action to instruct the CPE device 105 to begin outputting status information via one or more light indicators. For example, the mobile application may instruct the end-user to press a certain button (e.g., a button designated to initiate a process in which the CPE device 105 manipulates one or more light indicators according to an illumination pattern setting associated with a status or other information) on the CPE device 105. It will be appreciated that one or more existing buttons may be designated as the specific button that initiates the manipulation of the light indicators. For example, the CPE device 105 may be configured to initiate the output of information via the light indicator(s) in response to one or more specific buttons being depressed for a certain period of time, and the mobile application may output an instruction that identifies the specific button(s) to be depressed and a duration of time for which the button(s) need to be depressed.

When the specific action for initiating the output of status information via one or more light indicators is performed (e.g., when the specific button is pressed, etc.), the CPE device 105 may begin blinking one or more light indicators to output the current status of the CPE device 105 or an associated device or network. The bit sequence provided by the light indicators may be encoded using various patterns and/or segmentation. One way is to provide a pattern that includes a preamble (e.g. one or more light indicators on for a first duration, then off for a second duration, wherein the pattern is repeated a certain number of times; the first and second durations may be the same) to synchronize the light indicators with a camera on the mobile device 125. When the preamble is complete, a status code is provided by turning the light indicator(s) on or off based on the value of the code. Each "bit" of information may be provided at the same duration as the preamble (i.e., the first and/or second duration at which each light indicator is turned on and/or off). In embodiments, the CPE device 105 will cycle through each respective one of a plurality of status codes needed to be output, and the output of each individual status code may be separated from each other by the same preamble. An operation of the one or more light indicators associated with each of the one or more illumination settings may be preceded by a preamble.

The number of snapshots taken during a recorded video may depend on the frame rate of the camera (e.g., a camera shooting at 30 frames per second may pass status information at a rate of 30 bits per second). In embodiments, an application running at the mobile device 125 may adjust the frame rate at which an output from light indicators is captured in order to increase/decrease the data capture rate (e.g., by adjusting camera resolution, etc.). Photo detection may be performed using color filtering.

The mobile application may access and use a camera of the mobile device 125 to capture video or image frames of the blinking light indicators at the CPE device 105. Based upon the video or image frames received, the pattern and length of the preamble, as well as the length of the status code may then be determined by the mobile application. In embodiments, the specific color of each individual light indicator may either be known ahead of time by the mobile application (e.g., provided by the end-user, for example, based on a model number or similar identifier of the CPE device 105), or the color may be determined at runtime by testing for each possible LED color from a short list of possible colors.

In embodiments, color information may be used to detect a blinking light indicator. For example, the mobile application processes each frame by blocking out all colors except for the specific color emitted by one or more specific light indicator, converts the frame to black and white and then counts the number of white pixels. If the number of white pixels is above a certain threshold, then the light indicator is considered to be on; otherwise, the mobile application may determine that the light indicator is off.

In embodiments, a blinking light indicator may be detected through video processing by measuring the luminosity of each frame.

The mobile application may begin by searching for the preamble. When found, the mobile application captures the status code(s). Since the mobile application is able to synchronize with the CPE device 105 through the use of the preamble, then it also knows when to expect a transition from one bit of the status code to the next. This information is used to detect each bit of the status code.

Once a status code is successfully obtained the mobile application will display the value of the code along with a text description of the device status.

When the CPE device 105 detects a trigger for initiating an output of status information via one or more light indicators, the CPE device 105 may retrieve information associated with the status of the CPE device 105 and/or associated devices (e.g., client devices 110) and/or networks. It will be appreciated that this information may be retrieved via testing at the CPE device 105, from communications received from one or more client devices 110 and/or upstream network devices, or through various other methods and/or devices.

In embodiments, the CPE device 105 may generate and output a notification or indication of a current status of the CPE device 105, client device 110, and/or local or wide area networks, and/or recognized states or events by manipulating one or more light indicators of the CPE device 105. Manipulation of the one or more light indicators may be achieved using multiple light colors and/or variable blink rate patterns to provide a unique light indicator interface. As an example, multiple light colors (e.g., red, blue, white, green, etc.) may be used to illuminate each of the one or more light indicators of the CPE device 105, and multiple different variable blink rate patterns may be utilized by one or more light indicators of the CPE device 105 (e.g., fast blink rate (3 cycles per second), slow blink rate (1 cycle per second), etc.). Using these combinations of colors and blink rates, one or more light indicators may be utilized to encode a wide range of information.

In embodiments, the CPE device 105 may manipulate one or more functions associated with each of one or more light indicators. For example, the functions of a light indicator that may be manipulated by the CPE device 105 may include a color of the illuminated light indicator, a blink rate (e.g., a frequency at which the light indicator is illuminated), and a state of illumination (e.g., whether the light indicator is on/off, illuminated/not illuminated). The CPE device 105 may be configured with a map that associates each of one or more states, events, event logs, status updates, or other information with functions of one or more light indicators.

In embodiments, the CPE device 105 may be configured to associate each of one or more states, events, or other status information with a specific light indicator illumination pattern setting. For example, this illumination pattern setting may indicate a color, blink rate, state of illumination, or other parameter at which each light indicator of one or more light indicators is to be operated in response to a trigger for initiating an output of status information through the one or more light indicators.

Security may be achieved because status information is recognized based only on a visual output from the CPE device 105, and no information is passed from an end-user to the CPE device 105 during the output of status information. Information presented to an end-user may be gathered from one or more light indicators of a CPE device in various ways. For example, an application running at a mobile device 125 may observe a light indicator pattern currently displayed on the CPE device 105. The application may translate the pattern into a message (e.g., text message, audible message, etc.), wherein the message identifies, to an end-user a state or other status information associated with the pattern. For example, the mobile device 125 may output a display showing one or more light indicator patterns and an identification (e.g., text or graphical description) of a state associated with each of the displayed patterns. An end-user may compare a pattern being output by the CPE device 105 to the one or more patterns being displayed on the mobile device 125, and the end-user may identify a displayed pattern that matches the pattern being output by the CPE device 105. The end-user may then identify the state associated with the identified pattern. It should be understood that an application running at a mobile device 125 may be configured with light indicator patterns, status codes, and other information associated with one or more device types, device vendors, device models, and others. The application running at the mobile device 125 may identify (e.g., automatically or through end-user input) the CPE device 105 and may generate a list of light indicator patterns, status codes, and other information that is associated with the identified CPE device 105. In response to detecting a trigger for outputting status information (e.g., holding a WPS button for a period of time, a unique press of a reset button, etc.), the CPE device 105 may display error code information through one or more light indicators. For example, the CPE device 105 may respond by temporarily displaying an informational code via LEDs, wherein the code is interpreted and reported to an end-user by an application running at a mobile device 125. At stage 515, when a ranging process is repeated for user devices, a subsequent timing offset, can be obtained for user devices. The subsequent timing offset can be obtained by fraud detection software (e.g., fraud detection software 125 of FIG. 1) from the CMTS (e.g., CMTS 105 of FIG. 1).

Figure 2:
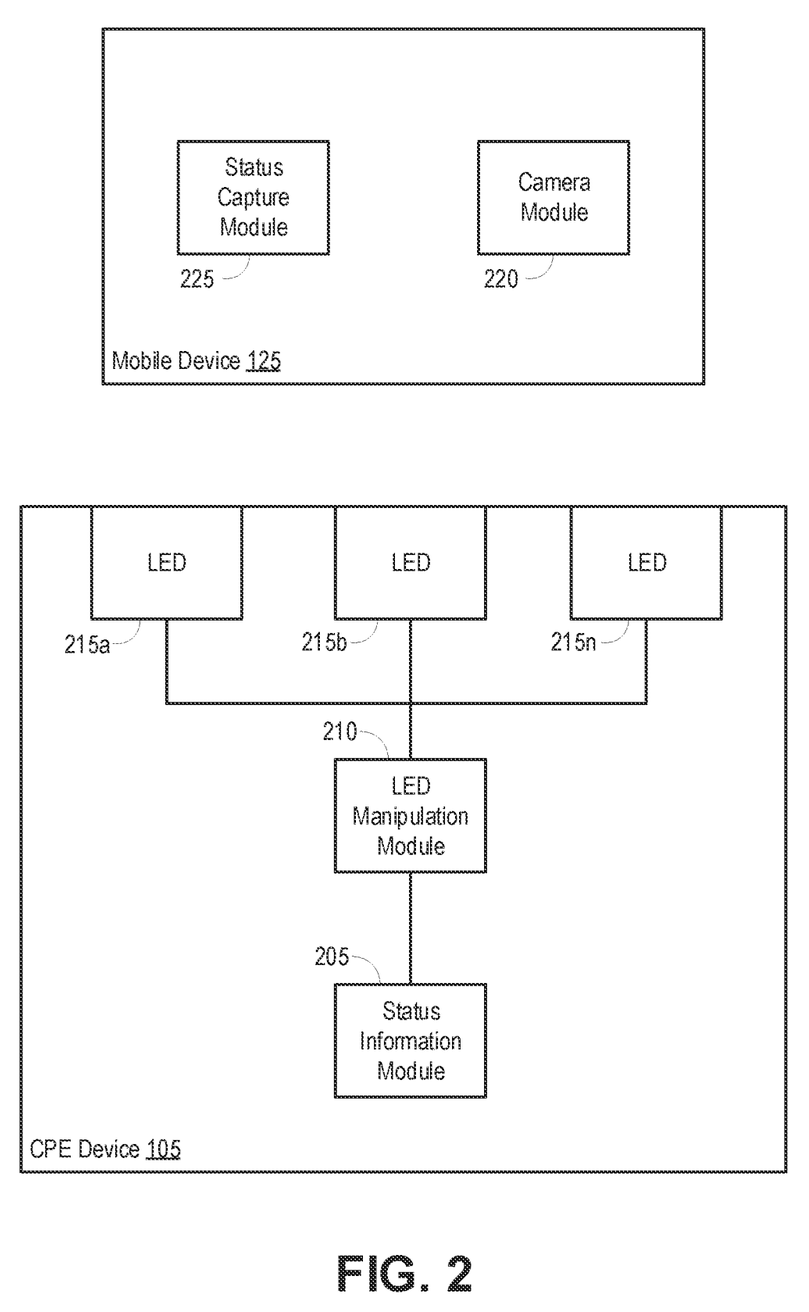
FIG. 2 is a block diagram illustrating an example CPE device operable to facilitate the output and recognition of status information through the operation of one or more light indicators.

FIG. 2 is a block diagram illustrating an example CPE device 105 operable to facilitate the output and recognition of status information through the operation of one or more light indicators. The CPE device 105 may include a status information module 205, an LED manipulation module 210, and one or more LEDs 215a-n. In embodiments, a mobile device 125 may capture and recognize the output of status information through the one or more LEDs 215a-n. The mobile device 125 may include a camera module 220 and a status capture module 225.

In embodiments, the status information module 205 may retrieve or gather status information and/or other information associated with the CPE device 105 and/or one or more other devices (e.g., client devices 110 of FIG. 1) and/or networks associated with the CPE device 105. The status information module 205 may retrieve or gather the status information in response to recognizing a trigger for initiating an output of status information through the one or more LEDs 215a-n.

In embodiments, the status information module 205 may be configured to recognize a state or event and to generate and output a notification or indication of the recognized state or event. For example, the state or event may be recognized by the status information module 205 as a state or event occurring at the CPE device 105, at a client device 110 of FIG. 1, at a network associated with the CPE device 105, or at an upstream network or element.

In embodiments, the status information module 205 may cause the status information and/or recognized states/events to be output through the one or more LEDs 215a-n. For example, the status information module 205 may notify the LED manipulation module 210 of the recognized state/event, and the LED manipulation module 210 may generate and output a notification or indication of the status information and/or recognized state or event by manipulating the one or more LEDs 215a-n. The LED manipulation module 210 may map the status information and/or recognized state/event to an associated combination of LED functions. In embodiments, according to the combination of LED functions associated with the status information and/or recognized state/event, the LED manipulation module 210 may manipulate one or more functions associated with each of one or more LEDs 215a-n. For example, the functions of an LED 215a-n that may be manipulated by the LED manipulation module 210 may include a color of the illuminated LED (e.g., red, blue, white, green, etc.), a blink rate (e.g., a frequency at which the LED is illuminated such as a fast blink rate (e.g., 3 cycles per second, etc.), slow blink rate (e.g., 1 cycle per second), and other rates), and a state of illumination (e.g., whether the LED is on/off, illuminated/not illuminated). Using these combinations of colors and blink rates, one or more LEDs 215a-n may be utilized to encode a wide range of information. The status information module 205 may be configured with a map that associates certain status information and/or each of one or more states or events with functions of one or more LEDs, and the LED manipulation module 210 may utilize the map to identify functions to be implemented at the LEDs 215a-n.

In embodiments, the CPE device 105 may receive a request to output status information, and the status information module 205 may recognize the received request. Prior to receiving the request to output status information, the LED manipulation module 210 may operate the LEDs 215a-n according to normal or default operating parameters. For example, the one or more LEDs 215a-n may be illuminated according to a normal or default illumination setting. An illumination setting may control a frequency at which each LED 215a-n is illuminated or blinked, a color of illumination for each LED 215a-n, and/or other visual parameters associated with a LED 215a-n.

As an example, an end-user may be instructed to press a certain button (e.g., a button designated to initiate a process in which the CPE device 105 manipulates one or more light indicators according to an illumination pattern setting associated with a status or other information) on the CPE device 105. It will be appreciated that one or more existing buttons may be designated as the specific button that initiates the manipulation of the light indicators. For example, the status information module 205 may be configured to initiate the output of information via the LEDs 215a-n in response to one or more specific buttons at the CPE device 105 being depressed for a certain period of time. It should be understood that the trigger for outputting status information through the LEDs 215a-n may be the depressing of the certain button, depressing the certain button for a certain period of time, receiving a communication from an external device, recognizing a specific status or alert at the CPE device 105 or an associated device (e.g., client device 110) or network, or other triggering event.

When the specific action for initiating the output of status information via one or more light indicators is detected (e.g., when the specific button is pressed, etc.), the status information module 205 may cause the LED manipulation module 210 to start blinking one or more LEDs 215a-n to output the current status of the CPE device 105 or an associated device or network. The bit sequence provided by the LEDs 215a-n may be encoded using various patterns and/or segmentation.

In embodiments, the status information module 205 may associate each of one or more states, events, or other status information with a specific LED illumination pattern setting. For example, this illumination pattern setting may indicate a color, blink rate, state of illumination, or other parameter at which each LED 215a-n is to be operated by the LED manipulation module 210 in response to a trigger for initiating an output of status information through the one or more LEDs 215a-n.

In embodiments, the status capture module 225 may initiate the camera module 220 in response to receiving a request to capture status information output through the LED(s) 215a-n of the CPE device 105. For example, the status capture module 225 may output instructions (e.g., through a GUI displayed at the mobile device 125 or other device) for initiating a process for capturing status information from the CPE device 105. The camera module 220 may capture snapshots, photos, and/or video of the illumination of the LEDs 215a-n during an output of status information by the CPE device 105. The status capture module 225 may translate the captured snapshots, photos, and/or video (e.g., based on recognized patterns) into a notification that identifies to an end-user one or more states, alerts, events, or other status information that is identified from the output of status information (e.g., the operation of the LEDs 215a-n) by the CPE device 105.

Figure 3:
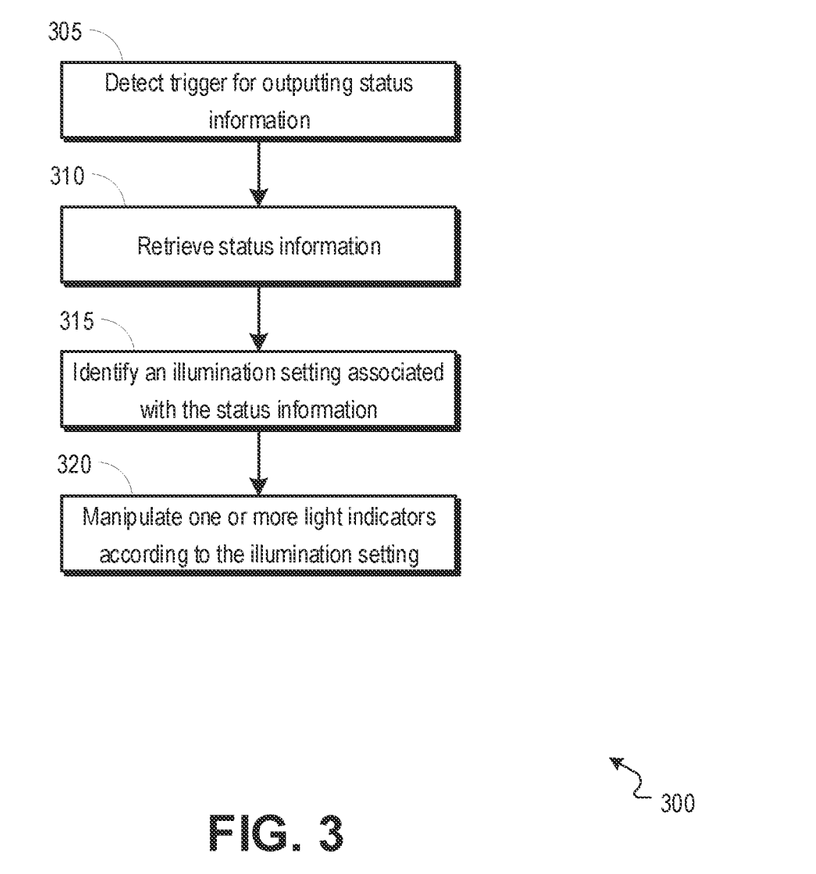
FIG. 3 is a flowchart illustrating an example process operable to facilitate outputting status information through one or more light indicators.

FIG. 3 is a flowchart illustrating an example process 300 operable to facilitate outputting status information through one or more light indicators. In embodiments, the process 300 may be carried out by a CPE device 105 of FIG. 1. The process 300 may start at 305, when a trigger for outputting status information is detected. The trigger for outputting status information may, for example, be an identification of a certain status, state, alert, event, or other trigger occurring at the CPE device 105 or at a device (e.g., client device 110 of FIG. 1) or network associated with the CPE device 105. As another example, the trigger for outputting status information may be a status information request that is received at the CPE device 105. The status information request may be received from end-user input at the CPE device 105 or as a communication received from an external device (e.g., upstream device, client device 110, etc.). The trigger for outputting status information may be recognized, for example, by the status information module 205 of FIG. 2.

At 310, status information may be retrieved. For example, the status information may be retrieved by the CPE device 105 and may include status, state, and/or alert information associated with the CPE device 105, a device associated with the CPE device 105 (e.g., client device 110 of FIG. 1), and/or one or more networks (e.g., local network, WAN, etc.) associated with the CPE device 105. In embodiments, a status information module 205 of FIG. 2 may retrieve or gather status information and/or other information associated with the CPE device 105 and/or one or more other devices (e.g., client devices 110 of FIG. 1) and/or networks associated with the CPE device 105. In embodiments, the status information module 205 may be configured to recognize a state or event and to generate and output a notification or indication of the recognized state or event. For example, the state or event may be recognized by the status information module 205 as a state or event occurring at the CPE device 105, at a client device 110 of FIG. 1, at a network associated with the CPE device 105, or at an upstream network or element.

At 315, one or more illumination settings associated with the retrieved status information may be identified, and one or more light indicators may be manipulated according to the identified illumination setting(s) at 320. In embodiments, the CPE device 105 may initiate a blinking of LEDs (e.g., LEDs 215a-n) to output a certain illumination pattern. The CPE device 105 may begin a sequence or illumination pattern by causing the LEDs to output a certain preamble (e.g. one or more light indicators on for a first duration, then off for a second duration, wherein the pattern is repeated a certain number of times; the first and second durations may be the same) to synchronize the light indicators with a camera on a mobile device 125 of FIG. 1. The LED manipulation module 210 may map the status information and/or recognized state/event to an associated combination of LED functions. In embodiments, according to the combination of LED functions associated with the status information and/or recognized state/event, the LED manipulation module 210 may manipulate one or more functions associated with each of one or more LEDs 215a-n. For example, the functions of an LED 215a-n that may be manipulated by the LED manipulation module 210 may include a color of the illuminated LED (e.g., red, blue, white, green, etc.), a blink rate (e.g., a frequency at which the LED is illuminated such as a fast blink rate (e.g., 3 cycles per second, etc.), slow blink rate (e.g., 1 cycle per second), and other rates), and a state of illumination (e.g., whether the LED is on/off, illuminated/not illuminated). Using these combinations of colors and blink rates, one or more LEDs 215a-n may be utilized to encode a wide range of information. The status information module 205 may be configured with a map that associates certain status information and/or each of one or more states or events with functions of one or more LEDs, and the LED manipulation module 210 may utilize the map to identify functions to be implemented at the LEDs 215a-n.

Figure 4:
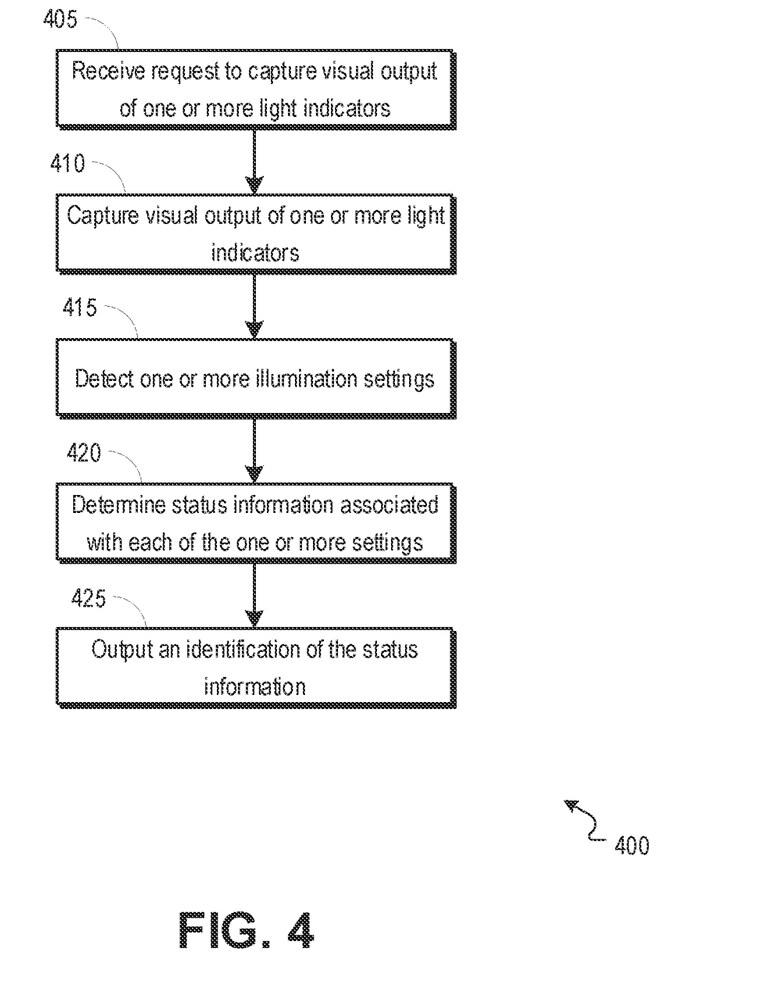
FIG. 4 is a flowchart illustrating an example process operable to facilitate a capture of status information output through one or more light indicators of a CPE device.

FIG. 4 is a flowchart illustrating an example process 400 operable to facilitate a capture of status information output through one or more light indicators of a CPE device. In embodiments, the process 400 may be carried out by a mobile device 125 of FIG. 1. The process 400 may start at 405, when a request to capture a visual output of one or more light indicators is received at the mobile device 125. For example, the request may be received at the mobile device 125 from a user input, from a communication received from a CPE device 105 of FIG. 1, or from some other triggering input or message.

At 410, a visual output of one or more light indicators may be captured. For example, a mobile device 125 may capture the visual output of one or more light indicators (e.g., LEDs 215a-n) of a CPE device 105, wherein the CPE device 105 has initiated a process of outputting status information through the one or more light indicators. In embodiments, the mobile device 125 may enable a camera of the mobile device 125, and the mobile device 125 may output a notification to an end-user, the notification instructing the end-user to point the camera towards the light indicators of the CPE device 105. The mobile device 125 may be configured to automatically (e.g., without receiving a request from the end-user to start/initiate an image/video capture) initiate an image/video capture of the light indicators of the CPE device 105. Alternatively, the mobile device 125 may initiate an image/video capture through the camera in response to receiving an input or command from an end-user.

At 415, one or more illumination settings may be detected. For example, the mobile device 125 may recognize one or more illumination patterns output by the one or more light indicators (e.g., LEDs 215*a-n*) of the CPE device 105. The one or more illumination patterns may be characterized by blink rate, color, illumination state, and/or other parameters associated with each of the light indicators over a duration. The illumination pattern(s) may be controlled by one or more illumination settings of the CPE device 105. The mobile device 125 may identify a start, end, and/or change in illumination patterns/settings based upon a recognition of a preamble sequence (e.g. one or more light indicators on for a first duration, then off for a second duration, wherein the pattern is repeated a certain number of times; the first and second durations may be the same) that indicates a start, end, and or change in an illumination pattern/setting that is being output by the light indicator(s) of the CPE device 105.

At 420, status information associated with each of the one or more detected illumination settings may be determined. For example, the mobile device 125 may map each of the one or more illumination settings (e.g., the illumination setting(s) detected by the mobile device 125 at 415) to a corresponding status, alert, or other type of information associated with the CPE device 105 and/or a device and/or network associated with the CPE device 105. An application running at the mobile device 125 may be configured with a map associating each of one or more illumination settings with a status, alert, or other type of information.

At 425, an identification of the determined status information may be output. For example, the mobile device 125 may output a communication, notification, and/or display that identifies, to an end-user, the status information (e.g., state, alert, etc.) associated with the visual output of the one or more light indicators of the CPE device 105. In embodiments, the mobile device 125 may output a visual (e.g., text, GUI (graphical user interface), etc.) or audible notification that identifies the status information to an end-user.

Figure 5:
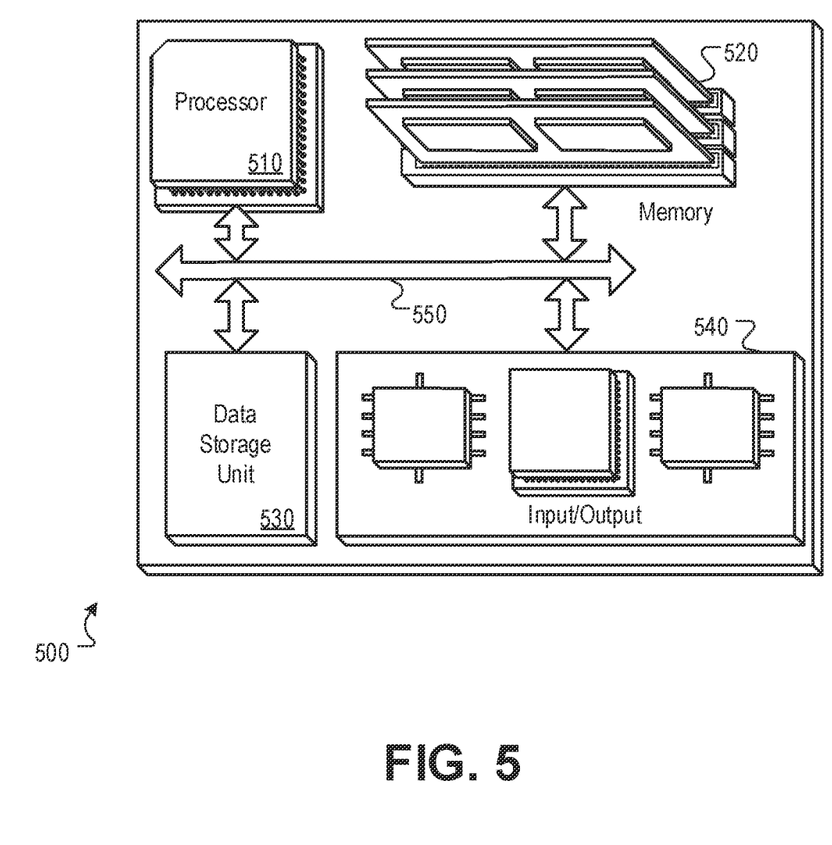
FIG. 5 is a block diagram of a hardware configuration operable to facilitate the output and recognition of status information through the operation of one or more light indicators.

FIG. 5 is a block diagram of a hardware configuration 500 operable to facilitate the output and recognition of status information through the operation of one or more light indicators. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 120 of FIG. 1, WAN 115 of FIG. 1, local network, etc.) and/or one or more CPE devices (e.g., CPE device 105 of FIG. 1) and/or clients (e.g., client devices 110 of FIG. 1, mobile device 125 of FIG. 1, etc.).

Those skilled in the art will appreciate that the invention improves upon methods and systems for recognizing and providing notification of events or states occurring at a CPE device or an associated network or device. Methods, systems, and computer readable media can be operable to facilitate recognizing and providing notification of events, states, and/or conditions associated with the CPE device and/or associated networks or devices. An application running on a mobile device (e.g., smart phone) can be used to observe and diagnose electronic equipment (e.g., CPE device). Equipment can have indicators (audio, visual, etc.) that a human would have difficulty interpreting correctly. A mobile device application can be programmed to observe audio and/or visual indicators, report status and possibly recommend course(s) of corrective action to the user. Since the information observed by the mobile device is unidirectional (from the equipment to the mobile device) there is no increased security risk.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   capturing through a camera of a first device, one or more frames comprising video or image frames of one or more light indicators associated with a second device;
   detecting a preamble, wherein the preamble comprises a first operation of the one or more light indicators;
   synchronizing the camera with the first operation of the one or more light indicators;
   based on the synchronization of the camera with the first operation of the one or more light indicators, capturing a status code from the one or more frames, wherein the status code is identified from a second operation of the one or more light indicators following the preamble, the second operation of the one or more light indicators comprising an illumination setting, and wherein the second operation of the one or more light indicators is different from the first operation of the one or more light indicators; and
   outputting a display identifying status information associated with the captured status code.

2. The method of claim 1, wherein the illumination setting comprises a color of illumination, a blink rate, and a state of illumination for each of one or more light indicators of the second device.

3. The method of claim 1, further comprising:
   outputting a display comprising instructions for triggering the second device to begin an output of status information.

4. The method of claim 1, wherein the status code is identified using color filtering on the one or more captured frames.

5. The method of claim 1, wherein the status code is associated with status information of the second device.

6. The method of claim 1, wherein the status code is associated with status information of a network that is associated with the second device.

7. The method of claim 1, further comprising:
   adjusting a frame rate of the camera to increase or decrease a rate at which one or more frames are captured.

8. A first device that:
   captures through a camera of a first device, one or more frames comprising video or image frames of one or more light indicators associated with a second device;
   detects a preamble, wherein the preamble comprises a first operation of the one or more light indicators;
   synchronizes the camera with the first operation of the one or more light indicators;
   based on the synchronization of the camera with the first operation of the one or more light indicators, captures a status code from the one or more frames, wherein the status code is identified from a second operation of the one or more light indicators following the preamble, the second operation of the one or more light indicators comprising an illumination setting, and wherein the second operation of the one or more light indicators is different from the first operation of the one or more light indicators; and outputs a display identifying status information associated with the captured status code.

9. The first device of claim 8, wherein the illumination setting comprises a color of illumination, a blink rate, and a state of illumination for each of one or more light indicators of the second device.

10. The first device of claim 8, wherein the status code is identified using color filtering on the one or more captured frames.

11. The first device of claim 8, wherein the status code is associated with status information of the second device.

12. The first device of claim 8, wherein the status code is associated with status information of a network that is associated with the second device.

13. The first device of claim 8, wherein the first device adjusts a frame rate of the camera to increase or decrease a rate at which one or more frames are captured.

14. One or more non-transitory computer readable media having instructions operable to cause one or more processors to perform the operations comprising:
- capturing through a camera of a first device, one or more frames comprising video or image frames of one or more light indicators associated with a second device;
- detecting a preamble, wherein the preamble comprises a first operation of the one or more light indicators;
- synchronizing the camera with the first operation of the one or more light indicators;
- based on the synchronization of the camera with the first operation of the one or more light indicators, capturing a status code from the one or more frames, wherein the status code is identified from a second operation of the one or more light indicators following the preamble, the second operation of the one or more light indicators comprising an illumination setting, and wherein the second operation of the one or more light indicators is different from the first operation of the one or more light indicators; and
- outputting a display identifying status information associated with the captured status code.

15. The one or more non-transitory computer-readable media of claim 14, wherein the illumination setting comprises a color of illumination, a blink rate, and a state of illumination for each of one or more light indicators of the second device.

16. The one or more non-transitory computer-readable media of claim 14, wherein the status code is identified using color filtering on the one or more captured frames.

17. The one or more non-transitory computer-readable media of claim 14, the operations further comprising:
- outputting a display comprising instructions for triggering the second device to begin an output of status information.

18. The one or more non-transitory computer-readable media of claim 14, wherein the status code is associated with status information of the second device.

19. The one or more non-transitory computer-readable media of claim 14, wherein the status code is associated with status information of a network that is associated with the second device.

20. The one or more non-transitory computer-readable media of claim 14, the operations further comprising:
- adjusting a frame rate of the camera to increase or decrease a rate at which one or more frames are captured.

* * * * *